("(12) United States Patent" header)

United States Patent
Provancher (10) Patent No.: US 9,285,878 B2
(45) Date of Patent: *Mar. 15, 2016

(54) SHEAR TACTILE DISPLAY SYSTEM FOR COMMUNICATING DIRECTION AND OTHER TACTILE CUES

(75) Inventor: William R. Provancher, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 610 days.

This patent is subject to a terminal disclaimer.

(21) Appl. No.: 12/182,906

(22) Filed: Jul. 30, 2008

(65) Prior Publication Data

US 2009/0036212 A1 Feb. 5, 2009

Related U.S. Application Data

(60) Provisional application No. 60/962,649, filed on Jul. 30, 2007.

(51) Int. Cl.
*G06F 3/038* (2013.01)
*G06F 3/01* (2006.01)

(52) U.S. Cl.
CPC ..................... *G06F 3/016* (2013.01)

(58) Field of Classification Search
CPC ........................................ G06F 3/016
USPC .............. 463/30, 46, 47, 37, 38, 48; 345/156, 345/173–179; 701/36
See application file for complete search history.

(56) References Cited

U.S. PATENT DOCUMENTS

| | | | |
|---|---|---|---|
| 4,540,979 | A | 9/1985 | Gerger et al. |
| 4,591,868 | A | 5/1986 | Cusey |
| 5,028,093 | A | 7/1991 | Nason |
| 5,184,319 | A | 2/1993 | Kramer |
| 5,261,266 | A | 11/1993 | Lorenz et al. |
| 5,273,384 | A | 12/1993 | Dunbar |
| 5,451,924 | A | 9/1995 | Massimino et al. |
| 5,587,937 | A | 12/1996 | Massie et al. |
| 5,589,828 | A | 12/1996 | Armstrong |
| 5,625,576 | A | 4/1997 | Massie et al. |

(Continued)

FOREIGN PATENT DOCUMENTS

| | | |
|---|---|---|
| JP | 2005 129044 | 5/2005 |
| KR | 20-0222674 | 5/2001 |

(Continued)

OTHER PUBLICATIONS

Arai et al. "Tactile Display Which Presents Shear Deformation on Human Finger" 2001.*

(Continued)

*Primary Examiner* — Ronald Laneau
*Assistant Examiner* — Ross Williams
(74) *Attorney, Agent, or Firm* — Workman Nydegger (57) ABSTRACT

A tactile display comprises a contact pad, operable to engage a target area of a user's skin. A restraining system is operable to restrain a portion of the user's skin distal from the target area of the skin. An actuation system is operably coupled to one of: i) the contact pad and the ii) restraining system. The actuation system is capable of moving the contact pad and the restraining system relative to one another to create a shear force across the target area of the user's skin to thereby provide tactile information to the user.

20 Claims, 8 Drawing Sheets

(56) References Cited

U.S. PATENT DOCUMENTS

| | | | |
|---|---|---|---|
| 5,631,861 A | 5/1997 | Kramer | |
| 5,694,013 A | 12/1997 | Stewart et al. | |
| 5,709,219 A | 1/1998 | Chen et al. | |
| 5,721,405 A | 2/1998 | Hamada | |
| 5,752,795 A | 5/1998 | D'Adamo | |
| 5,765,791 A | 6/1998 | Givonetti | |
| 5,767,796 A | 6/1998 | Van Roekel et al. | |
| 5,786,997 A | 7/1998 | Hoyt et al. | |
| 5,898,599 A | 4/1999 | Massie et al. | |
| 5,982,696 A | 11/1999 | Rao | |
| 6,042,555 A | 3/2000 | Kramer et al. | |
| 6,135,691 A | 10/2000 | Nadarajah et al. | |
| 6,158,933 A | 12/2000 | Nicholson | |
| 6,184,868 B1 | 2/2001 | Shahoian et al. | |
| 6,208,328 B1 | 3/2001 | Kawachiya et al. | |
| 6,236,306 B1 | 5/2001 | Liebelt | |
| 6,246,391 B1 | 6/2001 | Ong | |
| 6,330,837 B1 | 12/2001 | Charles et al. | |
| 6,388,655 B1 | 5/2002 | Leung | |
| 6,417,638 B1 | 7/2002 | Guy et al. | |
| 6,418,362 B1 | 7/2002 | St Pierre et al. | |
| 6,494,658 B1 | 12/2002 | Roy | |
| 6,535,806 B2 | 3/2003 | Millsap et al. | |
| 6,565,059 B1 | 5/2003 | Falconer | |
| 6,691,972 B1 | 2/2004 | Oliver | |
| 6,693,516 B1 | 2/2004 | Hayward | |
| 6,693,622 B1 | 2/2004 | Shahoian et al. | |
| 6,697,044 B2 | 2/2004 | Shahoian et al. | |
| 6,703,999 B1 | 3/2004 | Iwanami | |
| 6,788,999 B2 | 9/2004 | Green | |
| 6,793,234 B2 | 9/2004 | Carlstedt et al. | |
| 6,808,350 B1 | 10/2004 | Tooman et al. | |
| 6,859,819 B1 | 2/2005 | Rosenberg et al. | |
| 6,930,590 B2 | 8/2005 | Ling et al. | |
| 6,961,644 B2 | 11/2005 | Mercier et al. | |
| 6,982,696 B1 | 1/2006 | Shahoian | |
| 6,995,745 B2 | 2/2006 | Boon et al. | |
| 7,044,021 B2 | 5/2006 | Lorenz | |
| 7,077,015 B2 | 7/2006 | Hayward et al. | |
| 7,084,854 B1 | 8/2006 | Moore et al. | |
| 7,152,331 B2 | 12/2006 | Nakamura | |
| 7,196,688 B2 | 3/2007 | Schena | |
| 7,209,118 B2 | 4/2007 | Shahoian et al. | |
| 7,215,320 B2 | 5/2007 | Takeuchi et al. | |
| 7,242,112 B2 | 7/2007 | Wolf et al. | |
| 7,271,707 B2 | 9/2007 | Gonzales | |
| 7,333,088 B2 | 2/2008 | Boon et al. | |
| 7,339,574 B2 | 3/2008 | Kyung et al. | |
| 7,450,110 B2 | 11/2008 | Shahoian et al. | |
| 7,565,180 B2 | 7/2009 | Tsai | |
| 7,603,214 B2 | 10/2009 | Tanaka et al. | |
| 7,605,694 B2 | 10/2009 | Prost-Fin et al. | |
| 7,607,087 B2 | 10/2009 | Prados | |
| 7,683,735 B2 | 3/2010 | Shibahara | |
| 7,692,552 B2 | 4/2010 | Harrington et al. | |
| 7,710,279 B1 | 5/2010 | Fields | |
| 8,004,052 B2 | 8/2011 | Vaganov | |
| 8,011,234 B2 | 9/2011 | Kandler | |
| 8,026,798 B2 | 9/2011 | Makinen | |
| 8,125,453 B2 | 2/2012 | Shahoian | |
| 2001/0052893 A1 | 12/2001 | Jolly et al. | |
| 2002/0033795 A1 | 3/2002 | Shahoian et al. | |
| 2002/0068605 A1 | 6/2002 | Stanley | |
| 2002/0145512 A1 | 10/2002 | Sleichter, III et al. | |
| 2003/0016207 A1 | 1/2003 | Tremblay et al. | |
| 2004/0010346 A1 | 1/2004 | Stewart | |
| 2004/0025624 A1 | 2/2004 | Kreuzer | |
| 2004/0040805 A1 | 3/2004 | Bailey | |
| 2004/0060807 A1 | 4/2004 | Nishimoto | |
| 2004/0095369 A1 | 5/2004 | Takeuchi | |
| 2004/0104887 A1* | 6/2004 | Tsukamoto et al. | 345/156 |
| 2004/0106916 A1 | 6/2004 | Quaid et al. | |
| 2004/0117084 A1 | 6/2004 | Mercier et al. | |
| 2004/0129552 A1 | 7/2004 | Nakade | |
| 2004/0227727 A1 | 11/2004 | Schena et al. | |
| 2004/0237669 A1 | 12/2004 | Hayward et al. | |
| 2005/0021190 A1 | 1/2005 | Worrell et al. | |
| 2005/0052415 A1 | 3/2005 | Braun et al. | |
| 2005/0073195 A1 | 4/2005 | Popilek | |
| 2005/0110754 A1 | 5/2005 | Harley et al. | |
| 2005/0110758 A1 | 5/2005 | Kyung et al. | |
| 2005/0222830 A1 | 10/2005 | Massie et al. | |
| 2005/0231686 A1 | 10/2005 | Rathjen | |
| 2006/0115347 A1 | 6/2006 | Lee | |
| 2006/0115348 A1 | 6/2006 | Kramer | |
| 2006/0185921 A1 | 8/2006 | Cieler et al. | |
| 2006/0192760 A1 | 8/2006 | Moore et al. | |
| 2006/0227065 A1 | 10/2006 | Yukawa et al. | |
| 2006/0256075 A1 | 11/2006 | Anastas et al. | |
| 2007/0008083 A1 | 1/2007 | Berg et al. | |
| 2007/0091063 A1 | 4/2007 | Nakamura et al. | |
| 2007/0100523 A1 | 5/2007 | Trachte | |
| 2007/0241595 A1 | 10/2007 | Nathan et al. | |
| 2007/0265077 A1 | 11/2007 | Tom et al. | |
| 2007/0299580 A1 | 12/2007 | Lin et al. | |
| 2008/0024284 A1 | 1/2008 | Baratoff et al. | |
| 2008/0088582 A1 | 4/2008 | Prest et al. | |
| 2008/0111791 A1 | 5/2008 | Nikittin | |
| 2008/0120029 A1 | 5/2008 | Zelek et al. | |
| 2008/0174415 A1 | 7/2008 | Tanida et al. | |
| 2008/0192002 A1 | 8/2008 | Funch et al. | |
| 2008/0193260 A1 | 8/2008 | Yokokohji et al. | |
| 2009/0036212 A1 | 2/2009 | Provancher | |
| 2009/0096746 A1 | 4/2009 | Kruse | |
| 2009/0160770 A1 | 6/2009 | Shahoian | |
| 2009/0179854 A1 | 7/2009 | Weber et al. | |
| 2009/0278798 A1 | 11/2009 | Kim et al. | |
| 2010/0070254 A1 | 3/2010 | Tsai et al. | |
| 2011/0032090 A1 | 2/2011 | Provancher | |
| 2011/0115754 A1 | 5/2011 | Cruz-Hernandez | |
| 2012/0038468 A1 | 2/2012 | Provancher | |
| 2012/0122062 A1 | 5/2012 | Yang et al. | |

FOREIGN PATENT DOCUMENTS

| | | |
|---|---|---|
| WO | WO 01/91100 | 11/2001 |
| WO | WO 03/012557 | 2/2003 |
| WO | WO 2006/115347 | 11/2006 |
| WO | WO 2009/018330 | 2/2009 |
| WO | WO 2009/129287 | 10/2009 |
| WO | 2012048325 | 4/2012 |

OTHER PUBLICATIONS

Scheibe, R.; Moehring, M.; Froehlich, B., "Tactile Feedback at the Finger Tips for Improved Direct Interaction in Immersive Environments," 3D User Interfaces, 2007. 3DUI '07. IEEE Symposium on , vol., No., pp. 10-11 Mar. 2007.*

Drewing et al; First Evaluation of a Novel Tactile Display Exerting Shear Force via Lateral Displacement; ACM Transactions on Applied Perception; vol. 2; Apr. 2005; pp. 118-131.*

Micah Steele et al., Shared Control Between Human and Machine: Using a Haptic Steering Wheel to aid in Land Vehicle Guidance. University of Michigan, Ann Arbor, MI. 2001. 5 pages.

Mark Salada et al., Fingertip Haptics: A Novel Direction in Haptic Display. Northwestern University, Dept. of Mechanical Engineering and Dept. of Psychology. 2002. 10 pages.

Knut Drewing et al., First Evaluation of a Novel Tactile Display Exerting Shear Force via Lateral Displacement. ACM Transactions on Applied Perception, vol. 2, Apr. 2005, pp. 118-131.

Vincent Hayward et al., Tactile Display Device Using Distributed Lateral Skin Stretch. Dept. of Electrical Engineering Center for Intelligent Machines. McGill University. 2000. 6 pages.

Vincent Levesque et al., Experimental Evidence of Lateral Skin Strain During Tactile Exploration. Center for Intelligent Machines. Dept. of Electrical and Computer Engineering, McGill University. 2003 pp. 261-275.

Aaron Morris et al., A Robotic Walker That Provides Guidance. School of Computer Science, Carnegie Mellon University, Pittsburg PA. 2003, 6 pages.

Kanav Kahol et al., Tactile Cueing Haptic Visualization. Center for Cognitive Ubiquitous Computing. Arizona State University, Tempe Arizona. 2005. 4 pages.

(56) References Cited

OTHER PUBLICATIONS

Roope Raisamo & Jukka Raisamo. Haptic User Interfaces 2007. Power point presentation. 10 pages.
Alejandro D. Dominquez-Garcia et al., Haptic Interface for Automotive Steer-by-Wire Systems. Massachusetts Institute of Technology, Laboratory for Electromagnetic and Electronic Systems. Abstract, 2006 1 page.
Fritschi et al., "Integration of Kinesthetic and Tactile Display—A Modular Design Concept," Max-Planck Institute for Biological Cybernetics, Germany, 6 pages, no date.
Kim, Youn et al., "Hand-writing rehabilitation in the haptic virtual environment" IEEE, 2006, pp. 161-164.
Mullins, James et al., "Haptic handwriting aid for training and rehabilitation" 5 pages.
Rabin, Ely et al., "Haptic stabilization of posture: changes in arm proprioception and cutaneous feedback for different arm orientations" The American Physiologial Society, 1999, pp. 3541-3549.
Lam Paul, et al., "A haptic-robotic platform for upper-limb reaching stroke therapy: preliminary design and evaluation results" Journal of NeuroEngineering and Rehabilitation, May 22, 2008, 13 pages.
Rassmus-Grohn, Kirsten, "Enabling Audio-Haptics" Certec, Lund 2006, 126 pages.
Mali Uros, et al., "HIFE—haptic interface for finger exercise" IEEE, Feb. 2006, vol. 11, No. 1, pp. 93-102.
Phantom Premium 1.5/6DOF, 1.5 Highforce/6DOF and 3.0/6DOF haptic devices, 2 pages.
Cavusoglu, M. Cent et al., "Robotices for telesurgery: second generation berkely/UCSF laparoscopic telesurgical workstation and looking towards the future applications" Special issue on Medical Robotics, Jan. 2003, vol. 30, No. 1., 11 pages.
Sallnas, Eva-Lotta, "Supporting presence in collaborative environments by haptic force feedback" ACM Transactions on Computer-Human Interaction, Dec. 2000, vol. 7, No. 4, pp. 461-476.
Sjostrom, Calle et al., "The sense of touch provides new computer interaction techniques for disable people" Technology and Disabilty 1999, pp. 45-52.
Sjostrom, Calle et al., "The sense of touch provides new computer interaction techniques for disable people," Sweden 9 pages.
Abbott, Jake et al., "Haptic virtual fixtures for robot-assisted manipulation" Department of Mechanical Engineering ,The Johns Hopkins University. 11 pages.
Maclean, Karon, Haptics and the user interface, www.cs.ubc.ca/~maclean/publics/ 27 pages.
Phantom desktop haptic device, SensAble Technologies, Inc. 2008, 2 pages.
Provancher, U.S. Appl. No. 12/402,067, filed Mar. 11, 2009.
Rabin et al.; Haptic Stabilization of Posture: Changes in Arm Propioceptiona and Cutaneous Feedback for Different Arm Orientations; The American Physiological Society; 1999; pp. 3541-3549.
Related Case; U.S. Appl. No. 12/699,494, filed Feb. 5, 2009; William R. Provancher.
Related Case: U.S. Appl. No. 12/949,303, filed Nov. 18, 2010; William R. Provancher.
Related Case: U.S. Appl. No. 12/402,067, filed Mar. 11, 2009; William R. Provancher.
U.S. Appl. No. 12/402,067, filed Mar. 11, 2009; William R. Provancher; notice of allowance dated Aug. 3, 2012.
U.S. Appl. No. 13/041,169, filed Mar. 4, 2011, Provancher.
International Search Report for PCT/US2011/055633 dated Mar. 27, 2012.
Written Opinion for PCT/US2011/055633 dated Mar. 27, 2012.
International Search Report for PCT/US2008/071574 dated Mar. 18, 2009.
Written Opinion for PCT/US2008/071574 dated Mar. 18, 2009.
International Search Report for PCT/US2013/032053 dated Jul. 25, 2013.
Written Opinion for PCT/US2013/032053 dated Jul. 25, 2013.
U.S. Appl. No. 13/269,948, Mar. 15, 2013, Office Action.
U.S. Appl. No. 12/699,494, May 16, 2013, Notice of Allowance.
U.S. Appl. No. 12/699,494, Jan. 28, 2013, Office Action.
U.S. Appl. No. 12/182,906, Mar. 29, 2011, Office Action.
U.S. Appl. No. 12/182,906, Sep. 19, 2011, Final Office Action.
U.S. Appl. No. 12/949,303, Oct. 15, 2013, Office Action.
U.S. Appl. No. 13/041,169, Oct. 17, 2013, Office Action.
U.S. Appl. No. 13/269,948, Sep. 27, 2013, Final Office Action.
U.S. Appl. No. 12/699,494, Aug. 14, 2013, Notice of Allowance.
U.S. Appl. No. 13/269,948, Jul. 17, 2014, Office Action.
U.S. Appl. No. 12/949,303, May 22, 2014, Office Action.
U.S. Appl. No. 13/041,169, Jun. 17, 2014, Final Office Action.
U.S. Appl. No. 12/949,303, Dec. 2, 2014, Notice of Allowance.
U.S. Appl. No. 13/041,169, Dec. 2, 2014, Office Action.
European Search Report for EP08782519 dated Feb. 28, 2013.
U.S. Appl. No. 12/949,303, Mar. 3, 2015, Notice of Allowance.
U.S. Appl. No. 13/269,948, Mar. 13, 2015, Office Action.

* cited by examiner

FIG. 8A $V_{out} = V_2 - V_1$

FIG. 8B $i_{in} = i_1 - i_2$ $V_{out} = -R_f(i_1 - i_2)$

SHEAR TACTILE DISPLAY SYSTEM FOR COMMUNICATING DIRECTION AND OTHER TACTILE CUES

PRIORITY

Priority is claimed of U.S. Provisional Patent Application Ser. No. 60/962,649, filed Jul. 30, 2007, which is hereby incorporated herein by reference in its entirety.

BACKGROUND

The field of haptics is the science of interfacing with users via the sense of touch by applying forces, vibrations or motions to a user. Haptic devices are increasingly becoming used to provide sensory input to a user to provide information to the user: similar to the manner in which sights and sounds provide information to the user about a surrounding environment. As an example, one commonly available (albeit simplistic) haptic device is the game stick (or "joystick") controller sold by Nintendo under the trade name "Rumble Pak." This haptic device produces vibratory motion at various times during gameplay to provide the game player, through his or her sense of touch, with information relating to a scenario of the game: e.g., when he or she fires a weapon or receives damage in the game. Haptic devices are also recognized as an integral part of virtual reality systems, which attempt to simulate, through the application of forces to a participant, situations he or she "experiences" in the virtual environment.

While haptic devices have been produced for a variety of uses, many technological hurdles remain.

SUMMARY OF THE INVENTION

In accordance with one embodiment, the invention provides a tactile display, including a contact pad, operable to engage a target area of a user's skin. A restraining system can be operable to restrain a portion of the user's skin distal from the target area of the skin. An actuation system can be operably coupled to one or both of: i) the contact pad and the ii) restraining system. The actuation system can be capable of moving the contact pad and the restraining system relative to one another to create a shear force or motion across the target area of the user's skin to thereby provide tactile information to the user.

In accordance with another aspect of the invention, a method of providing directional cues to a user is provided, including: restraining a portion of at least one of the user's fingers; engaging with a contact pad a target area of skin of the user; and moving the target area of skin and the contact pad relative one another to provide a shear force or motion across the target area of skin of the user to provide directional cues to the user.

In accordance with another aspect of the invention, a method of providing a user with directional cues while the user is operating an apparatus provided, including: restraining a finger of the user with a restraining structure coupled to or formed in the apparatus, to thereby at least partially restrain some skin of the finger; engaging a target area of skin of the finger with a contact pad; and moving the contact pad and the target area of skin relative to one another to thereby provide directional cues to the user, the directional cues being related to a directional aspect of the apparatus.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENTS

The following detailed description of exemplary embodiments of the invention makes reference to the accompanying drawings, which form a part hereof and in which are shown, by way of illustration, exemplary embodiments in which the invention may be practiced. While these exemplary embodiments are described in sufficient detail to enable those skilled in the art to practice the invention, it should be understood that other embodiments may be realized and that various changes to the invention may be made without departing from the spirit and scope of the present invention.

In describing and claiming the present invention, the following terminology will be used.

As used herein, application of a shear force or motion to a user's skin is to be understood to refer to application of a force that results in a sliding motion or "skin stretch" being applied to the user's skin such that the user's skin is pulled (or tends to be pulled) in a transverse, as opposed to a normal, direction. Such an application will tend to create a tensile force on a trailing edge of the skin being targeted and a compressive force on a leading edge of the skin. Shear forces can be applied to the skin while sliding a contact pad across the skin (e.g., some slip between the contact pad and the targeted skin); or while moving the contact and the surface of the skin together (e.g., little or no slip between the contact pad and the targeted skin).

Application of shear forces is to be understood to be distinct from application of kinesthetic forces, as that term is understood by those of ordinary skill in the art. As one example, the application of shear force to a user's finger pad by moving a shear plate transverse to the user's finger pad (thereby causing local skin deformations) is to be distinguished from the kinesthetic forces and motions experienced by a user as a stylus or other device is applied to a user's fingers or hand causing (or tending to cause) motion of the finger, hand, and/or arm joints. The local shear deformations in the skin from moving a shear plate transverse to the user's skin are also distinct from the forces experienced by a user when a device is merely vibrated to provide information to a user. Typically, application of a shear force requires relative movement of the user's target skin area (e.g., finger pad or palm) relative to a shear plate, which relationship can occur by way of movement of the target skin area, movement of the shear plate, or both. Typically speaking, however, relative transverse movement is required to apply the shear force that is reacted locally, whereas application of kinesthetic forces can be realized without locally reacted relative transverse motion, since the kinesthetic forces are reacted away from the target area of the skin.

When reference is made herein to "a portion of a user's skin distal from a target area of the skin," it is to be understood that the distal portion of the skin can be immediately adjacent the target area of skin; or, the portion of the skin may be relatively far removed from the target area but is nonetheless restrained to enable application of a shear force across the target area of skin. This latter case can be realized, for example, by restraining a user's finger at or near the middle phalanx while moving the user's finger pad relative to a shear plate: in this case the distal portion of the user's skin is at or near the middle phalanx while the target area is at or near the finger pad.

As used herein, the term "finger well" is to be understood to refer to a structure into which at least a portion of a user's finger can be disposed to partially immobilize portions of the user's skin in the finger well to enable or enhance the application of shear forces to the user's skin. Generally speaking, the finger well will include a "window" or other orifice through which a contact can be felt by the user's finger pad. Importantly, application of shear forces through a finger well can be accomplished by a contact pad that is larger in size than is the window formed in the finger well (for example, the edges of the contact pad may never appear in the window through the entire range of motion of the contact pad).

As used herein, the term "directional aspect" is to be understood to refer to some characteristic of a system that relates to or involves movement or travel in optional directions. For example, when the system is a vehicle, the directional aspect may be related to the direction in which the vehicle is traveling; or to a direction in which it is desirable that the vehicle travel or turn. As another example, when the referenced system is a personal computing device, the directional aspect may relate to a direction of travel of a cursor, menu item, icon or similar component of the personal computing device.

As used herein, the term "force or motion application pattern" is to be understood to refer to a characteristic, or set of characteristics, exhibited while shear forces or motions are applied to a user's skin. The force or motion application pattern can vary in aspects including, but not limited to, magnitude of the force applied, displacement of one or more components relative to another, velocity of one or more components relative to another, frequency of application of the force, repeating patterns of one or more of the other varying attributes, etc.

As used herein, the term "personal computing device" is to be understood to refer to an electronic device useable by a consumer to perform some task. Examples of personal computing devices include, without limitation, notebook computers; desktop computers; hand-held devices such as cell phones, personal digital assistants, music players, global positioning devices, game controllers, etc.

As used herein, relative terms, such as "upper," "lower," "upwardly," "downwardly," etc., are used to refer to various components of the systems discussed herein, and related structures with which the present systems can be utilized, as those terms would be readily understood by one of ordinary skill in the relevant art. It is to be understood that such terms in no way limit the present invention but are used to aid in describing the components of the present systems, and related structures generally, in the most straightforward manner.

As used herein, the term "substantially" refers to the complete or nearly complete extent or degree of an action, characteristic, property, state, structure, item, or result. As an arbitrary example, when an object or group of objects is/are referred to as being "substantially" symmetrical, it is to be understood that the object or objects are either completely symmetrical or are nearly completely symmetrical. The exact allowable degree of deviation from absolute completeness may in some cases depend on the specific context. However, generally speaking the nearness of completion will be so as to have the same overall result as if absolute and total completion were obtained.

The use of "substantially" is equally applicable when used in a negative connotation to refer to the complete or near complete lack of an action, characteristic, property, state, structure, item, or result. As an arbitrary example, an opening that is "substantially free of" material would either completely lack material, or so nearly completely lack material that the effect would be the same as if it completely lacked material. In other words, an opening that is "substantially free of" material may still actually contain some such material as long as there is no measurable effect as a result thereof.

Invention

The present invention provides systems and methods for displaying to a user tactile information by way of application of shear forces to, or motions across, the skin of the user. The invention can be utilized in a number of applications, including as a manner in which users of equipment can be provided with information relating to operation of the equipment. For example, in one aspect, a system in accordance with the invention can be incorporated into the steering wheel of a vehicle to provide information relating to operation of the vehicle in a manner that does not require that the operator perceive visual or auditory signals. Such an application can be beneficial in applications where ambient noises are problematic, or where it is not desirable to overload visual input to the operator/driver. Further, it has been found that certain types of information are more intuitively processed and understood by users, possibly with lower cognitive load, when provided in a tactile manner, as compared to visual and auditory presentation.

Figure 1:
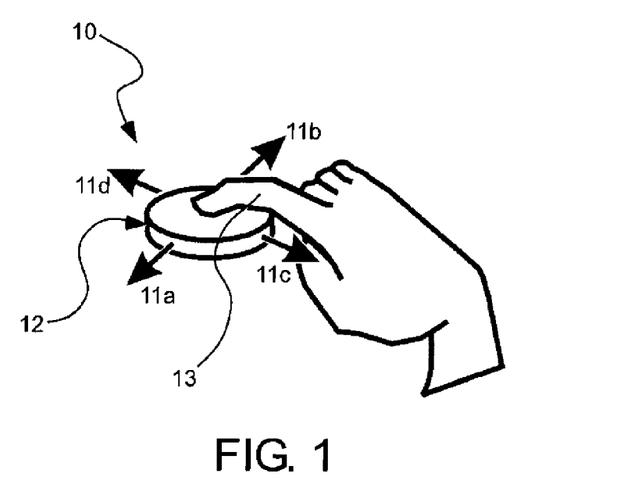
FIG. 1 is a perspective view of a conceptual shear tactile display system in accordance with an embodiment of the invention.

A general aspect of the invention is illustrated at 10 in FIG. 1, where it can be seen that the system 10 can typically include a contact pad 12 that can be suitable for engaging a target area of a user's skin (the target area of the skin in this example is the pad of the finger 13 in immediate contact with the contact pad). As the contact pad is moved transversely relative to the target area of skin, the person experiences the sensation of a shear force or stroking motion being applied to the user's skin. In most aspects of the invention, the force applied to the user's skin is applied primarily in a transverse direction: forces of any significance applied normally to the skin surface are neither necessary nor, generally, desirable. The force applied to the user's skin will generally be in the direction indicated by one of the directional indicators 11a, 11b, 11c, 11d: however, application of motions in between these indicated directions are also possible.

Tactile feedback can be provided to a person's finger tip, hand, or other body surface in the form of shear motions and forces that can be sensed by cutaneous touch receptors of the skin. The contact pad can be stroked or slid over the finger, but when combined with a contact pad of sufficient friction these shear motions and forces induce skin stretch which results in increased perceived sensation. Either mode of feedback can be used to communicate information to the user, information including, but not limited to, cues such as slip, friction and direction.

Depending upon the embodiment of the invention, the force can be applied in a variety of patterns. In the example where the invention is incorporated into a vehicle, the force or stroking motion may be applied in direction 11a to indicate to the user, for example, that he or she should navigate the vehicle in that direction. In this example, the contact pad 12 can be moved once in the direction 11a, or can be moved back-and-forth in directions 11a and 11b, with the movement in direction 11a differing in some aspect from the movement in direction 11b. In other words, the pad 12 might be moved in direction 11a at a relatively high rate, and "returned" to a null position by moving along direction 11b at a relatively slower, less perceptible rate. This force or motion application pattern can be repeated multiple times to provide the operator with the greatest opportunity to sense and correctly interpret the information being provided.

Other exemplary force or motion application patterns can include moving the contact pad in direction 11a while the pad and the target area of skin are in contact, then breaking contact between the target area of skin and the pad to return the pad to a null position. This aspect of the invention is illustrated by example in FIG. 10, where contact pad 12a can move laterally to apply the shear force to the target area of skin 15, after which it can be moved normal to the skin (i.e., it can break contact with the skin), and return to a null position. Contact with the skin can be made again, and the shear force can again be applied to the skin (at either the same magnitude, velocity, etc., or at a differing magnitude, velocity, etc.). In this manner, the user does not necessarily sense the return movement of the pad, which otherwise may cause confusion on the direction being indicated. Contact between the pad and the target area of skin can be broken by either moving the pad normal to (and away from) the target area of skin; or by moving the target area of skin normal to (and away from) the contact pad. In other words, the contact pad may be capable of moving only in 2 axes (both tangentially to the skin surface), while a finger well (36, in FIGS. 9 and 11-12, for example) is capable of moving the skin surface normally away from the contact pad.

Figure 10:
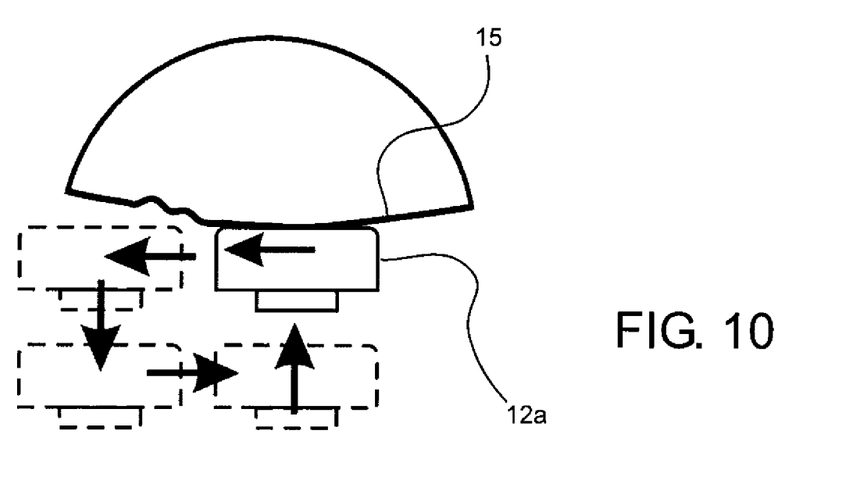
FIG. 10 is a schematic representation of an application of the present invention in use with a finger well and a contact pad capable of selectively breaking contact with the skin surface (the skin surface shown is a portion of a finger or a palm in this example)
Figure 11:
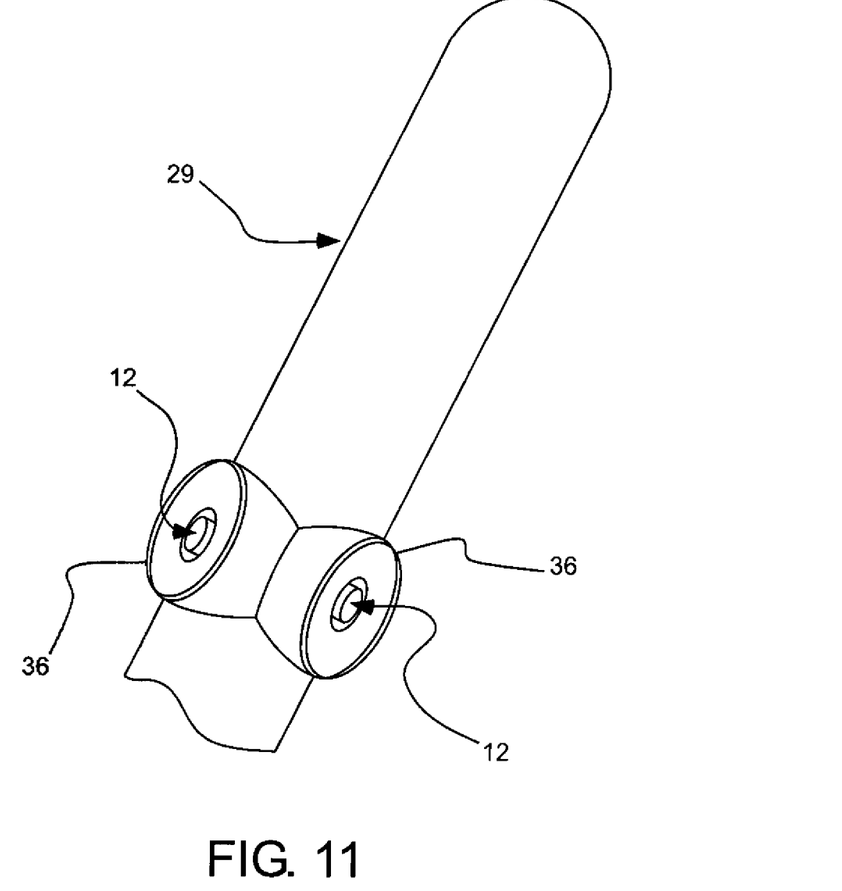
FIG. 11 is a schematic representation of an application of the present invention in use with a finger well coupled to or integrated with a stylus.

A similar effect to that illustrated in FIG. 10 can be accomplished by actively varying the effective coefficient of friction of the contact pad by vibrating the contact pad with ultrasonic vibrations as recently demonstrated in the field of haptics. By actively varying the friction of the contact pad, the pad 12 might, for example, be moved in direction 11a at a relatively high friction level, and "returned" to a null position by moving along direction 11b at a relatively lower, less perceptible friction level. This force or motion application pattern can be repeated multiple times to provide the operator with the greatest opportunity to sense and correctly interpret the information being provided.

It is also contemplated that the force or motion application pattern can be varied depending upon the urgency of the information being conveyed to the user. Again using the example of the vehicle application, in non-critical scenarios, a "low-key" signal can be provided to the user by using a relatively slower or shorter displacement of the contact pad relative to the target area of skin. Such might be the case, for example, if information were being provided to the operator that he or she had failed to disengage the turn signal of the vehicle after making a turn. If information of relatively higher importance were being provided to the operator, the intensity of the force or motion application pattern can be increased by increasing the magnitude or speed of the movement of the contact pad, for example.

Figure 2A:
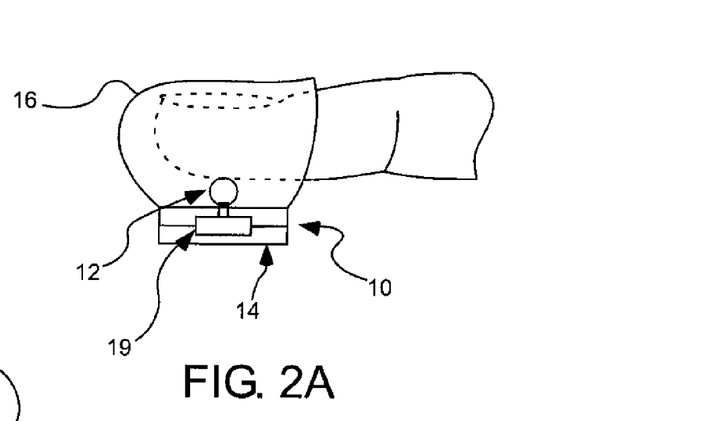
FIG. 2A is a side, partially sectioned view of a compact, shear tactile display actuator assembly in accordance with an embodiment of the invention.
Figure 2B:
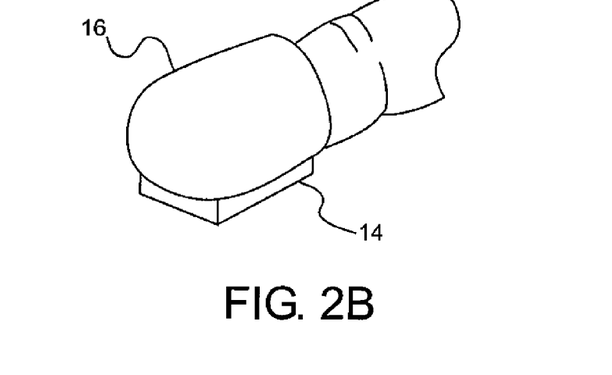
FIG. 2B is a perspective view of the display of FIG. 2A.
Figure 3:
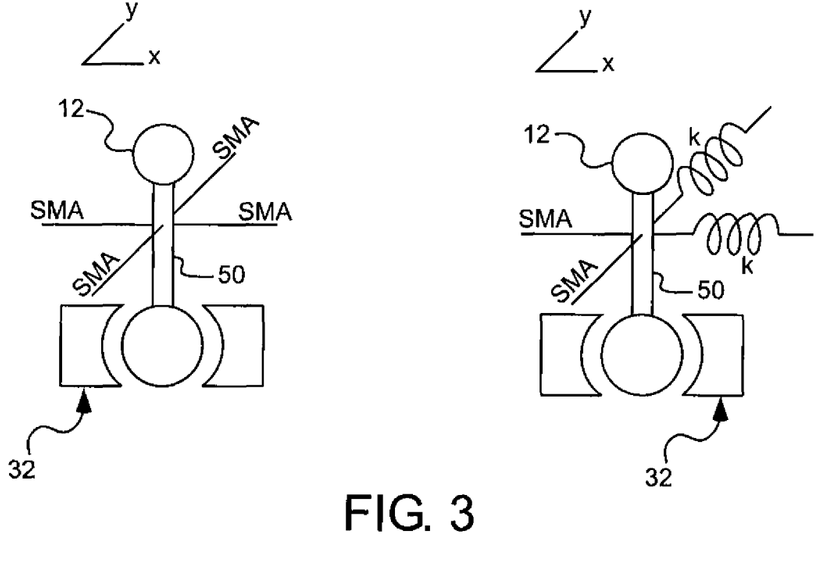
FIG. 3 includes two schematic views illustrating exemplary manners of actuating the shear contact pad of the present invention.

The invention can be incorporated into a variety of systems, some of which are explicitly shown and discussed herein. In one exemplary application, illustrated in FIG. 2, the system includes a contact pad 12, and a base 14. The base can be configured to be coupled to an external support structure over which, or adjacent to which, the user can place his or her finger. In the embodiment shown, the base is coupled to a thimble structure 16 that can be mountable over the finger (or thumb) of the user's hand. An actuation system 19 (shown generally in FIG. 2A, with more explicit examples provided in FIGS. 3, 4, 6 and 7) can be actuated to move the contact pad relative to the base and transversely to the target area of the user's skin.

The contact pad can be formed in a variety of shapes and sizes, and can include a substantially planar surface that contacts the target area, or can include a rounded or curved or otherwise non-planar geometry. The contact pad can be smooth (or rolling) for presenting sliding motions, or can have high friction and/or texture to amplify the perceived sensation by applying skin stretch rather than sliding motion. The contact pad can include a series of spaced contact points extending therefrom (e.g. a textured surface), and the contact points can move relative to the user's skin while remaining substantially fixed relative to one another. In this embodiment, while the contact pad is generally continuous across its surface, the surface of the contact pad may be formed from a serious of points, bumps, or other protrusions, due either to the natural undulation of the material used, or intentional landscape added to the pad. In the event the pad includes such points or bumps, the tips of the points or bumps that contact the user's skin will generally all move as an integral unit, e.g., a spacing relationship between the points or bumps will be maintained as the pad moves relative to the user's skin, hence constituting a textured surface.

The target area of the user's skin can be sufficiently large to cause the user to experience the sense of shear forces acting upon the target area. While the size of the target area can vary, it must generally be large enough so that the user experiences more than a mere touching sensation; the user should be able to feel and discern that a shear force or stoking motion is being applied to his or her finger. In one aspect of the invention, a width of the contact pad can be at least about 3 millimeters. In compact applications, a width of the contact pad can be greater than a height of the contact pad (e.g., a total height of the device can be less than a total width of the device). In one embodiment, a distance from a bottom-most portion of the base to an uppermost portion (e.g., a "height" of the device) of the contact pad is less than about 0.50 inches. In other embodiments, a minimum height can be about 1.5 inches. In one embodiment, a total package size of the device can be on the order of 2×2 inches. Thus, the display system can be formed in a relatively small package so as to easily installable adjacent structures over which a user typically places his or her hands or fingers, yet be fully functional despite this small footprint.

Figure 4:
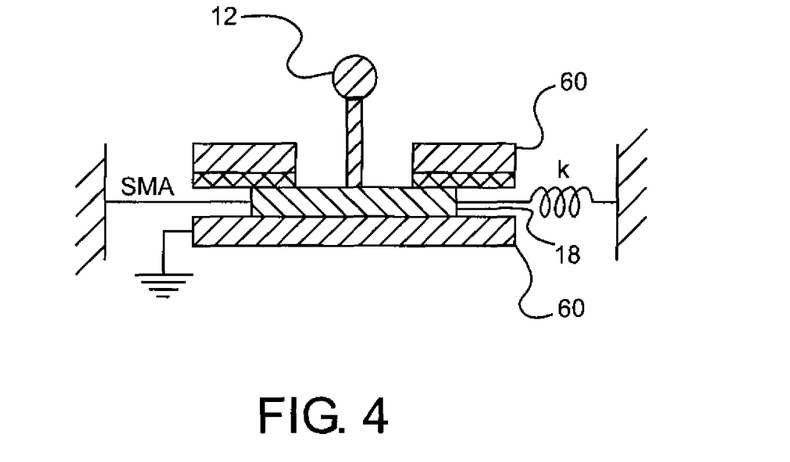
FIG. 4 is a schematic view illustrating the components of a compact shear tactile display in accordance with an embodiment of the invention.
Figure 7:
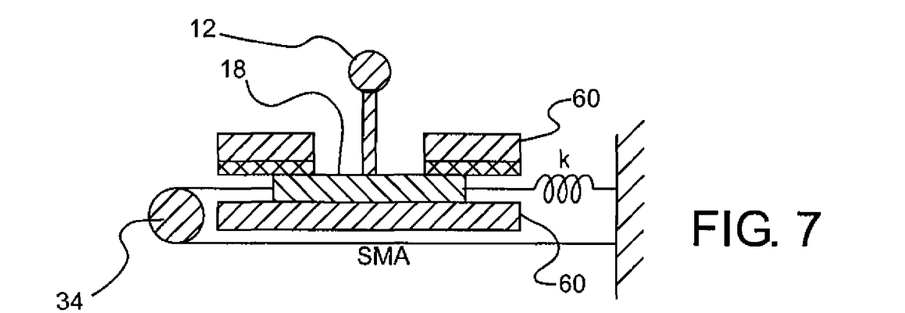
FIG. 7 is a schematic view of an exemplary compact shear display assembly in accordance with an aspect of the invention.
Figure 8A:
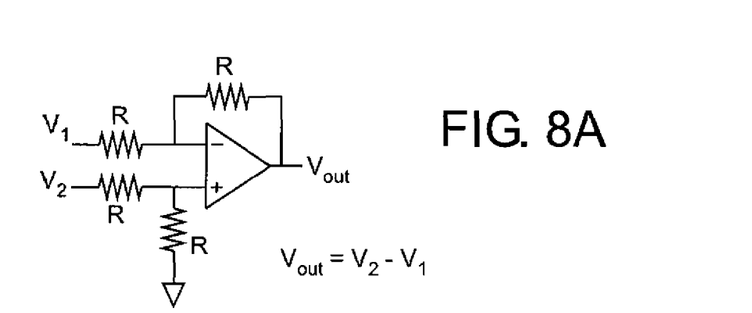
FIG. 8A is an exemplary control/sensing circuit in accordance with an aspect of the invention for use with voltage-based sensors.
Figure 8B:
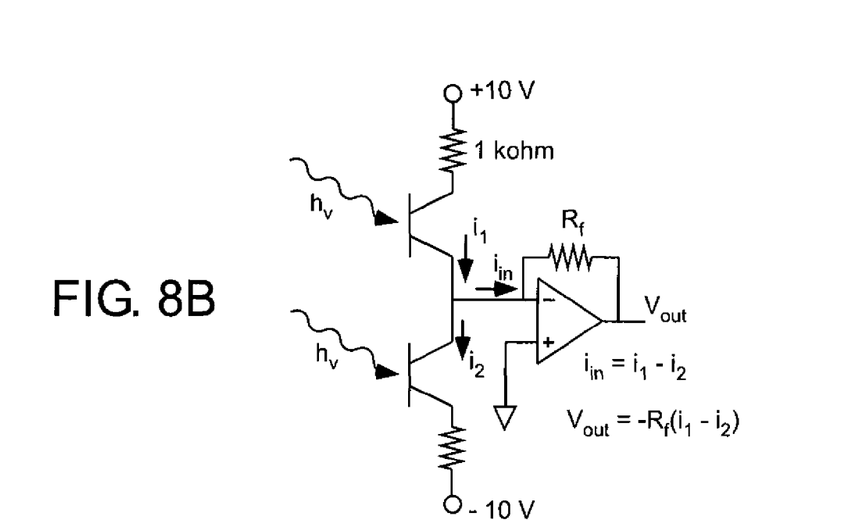
FIG. 8B is an exemplary control/sensing circuit in accordance with an aspect of the invention for use with current-based sensors.

Various exemplary actuation systems are illustrated in a generalized manner in FIGS. 3, 4, 6 and 7. In the example shown in FIG. 3, the contact pad 12 can be coupled to a rod 50 which rests in spherical bearing 32 and can be actuated by Shape Memory Alloy ("SMA") devices known to those of ordinary skill in the art. In the embodiments illustrated in FIGS. 4, 6 and 7, the contact pad 12 is coupled to a bearing plate 18 that is moved to achieve movement of the contact pad 12. The bearing plate 18 can be supported by parallel plates that form a bearing housing 60. In the examples provided, various springs (shown with spring constants "k") and SMA devices coordinate to achieve movement of the contact pad. The embodiments illustrated as cross-sectional views in FIGS. 4 and 7 are similar in operation, with the embodiment of FIG. 6 including pulley 34 (or multiple pulleys) that enables use of the SMA while limiting an overall size of the package of the system.

Figure 5:
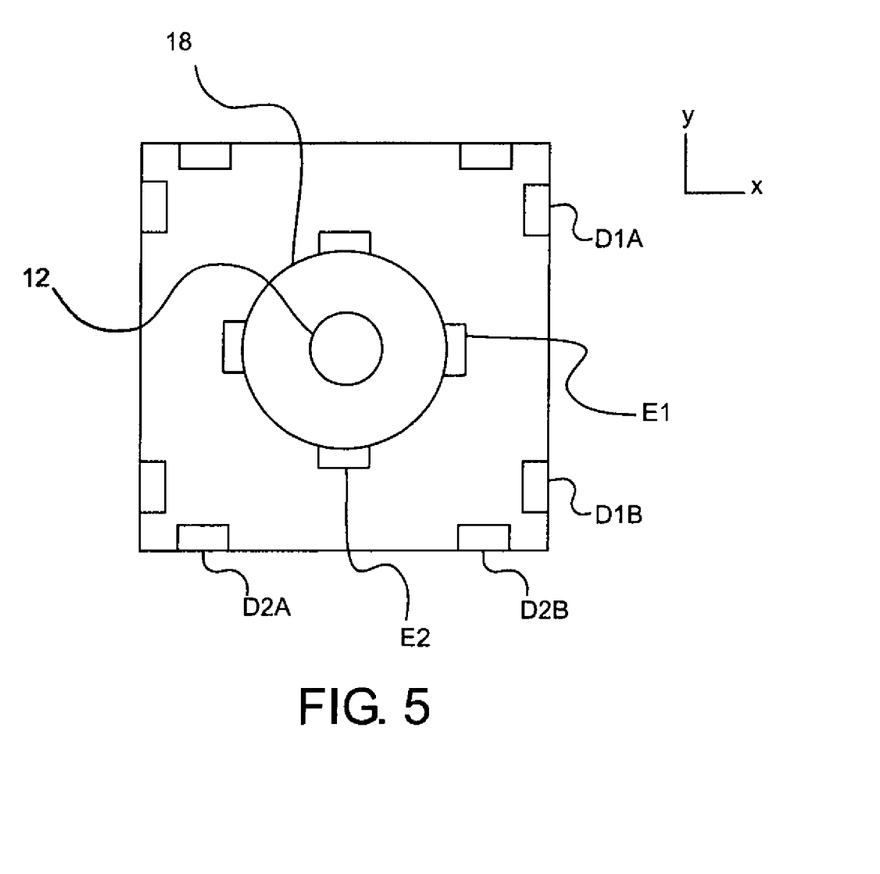
FIG. 5 is a schematic view of an exemplary sensing system in accordance with an aspect of the invention.
Figure 6:
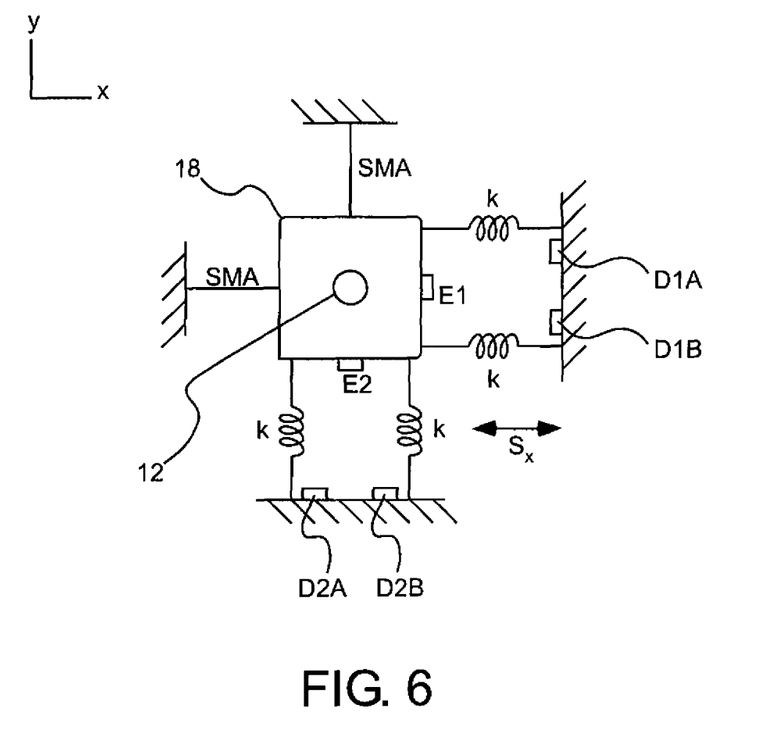
FIG. 6 is a schematic view of an exemplary control/sensing system in accordance with an aspect of the invention.

FIG. 5 illustrates one exemplary manner in which movement of the system can be measured using various emitters (E1, E2, etc.) and detectors (D1A, D1B, etc.). As the bearing plate 18 and contact pad 12 are moved, the pairs of detectors can register the movement and can provide a corresponding signal to a suitable data processing system (not shown). This concept is incorporated into the control/sensing system of FIG. 6. This embodiment utilizes principles similar to those outlined above, with the addition of a pair of springs opposing each SMA device to limit potential rotation of the bearing plate 18 during translational movement to reduce the potential of incorrect readings by the detectors and emitters.

The examples illustrated in FIGS. 3-8B are provided merely to describe various implementations of the invention; these examples will be readily understandable to one having ordinary skill in the art and will not be expanded upon in detail herein. Many of the examples shown, however, enable provision of the unique features of the present invention in a very small, compact package that can be readily incorporated into various apparatuses, such as computing devices, vehicles, steering components of vehicles, etc. It is, of course, to be understood that these examples are provided only to illustrate various manners in which the invention can be implemented; many other suitable actuation and sensing systems can be utilized.

While the specific structure utilized in the actuation system of the present display can vary, generally the tactile display is capable of a range of motion of from about ±0.05 mm of travel on two axes to about ±5 mm of travel on two axes. In one embodiment, the contact pad and the target area of skin need move relative to one another by only about 0.05 mm to about 1 mm.

Figure 9:
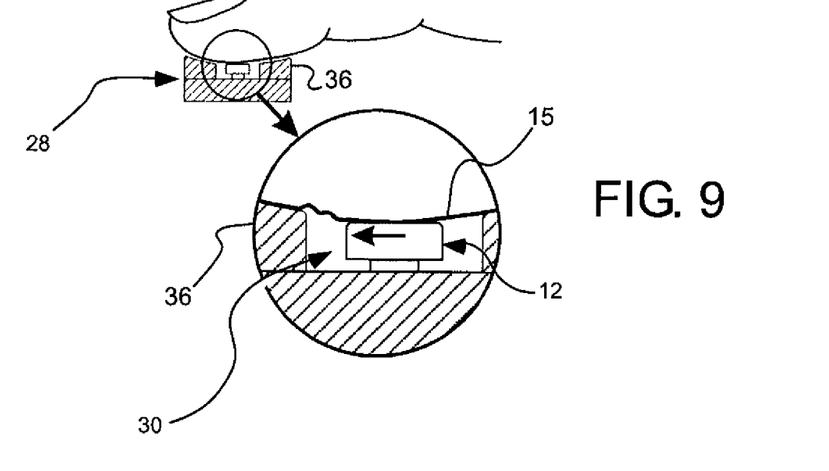
FIG. 9 is a schematic representation of an application of the present invention in use with a finger well.

FIG. 9 illustrates an embodiment of the invention that incorporates a finger well 36 including a recession 30 into a generalized structure 28. A contact pad 12 can be located or disposed within or adjacent the well. The well can serve as tactile indicator of the location of the contact pad so that a user can locate the contact pad by touch (note that the well need not, necessarily, coincide with the location of the contact pad). The well also serves as a restraining structure that restrains portions 15 of the user's skin adjacent the target area of skin, to better transmit the shear forces to the target area of skin. In addition, the well itself can also be independently actuated in two-dimensions relative to the generalized structure 28 (similar to the embodiment illustrated in FIG. 10, except that the well moves instead of, or in addition to, the contact pad).

Figure 12:
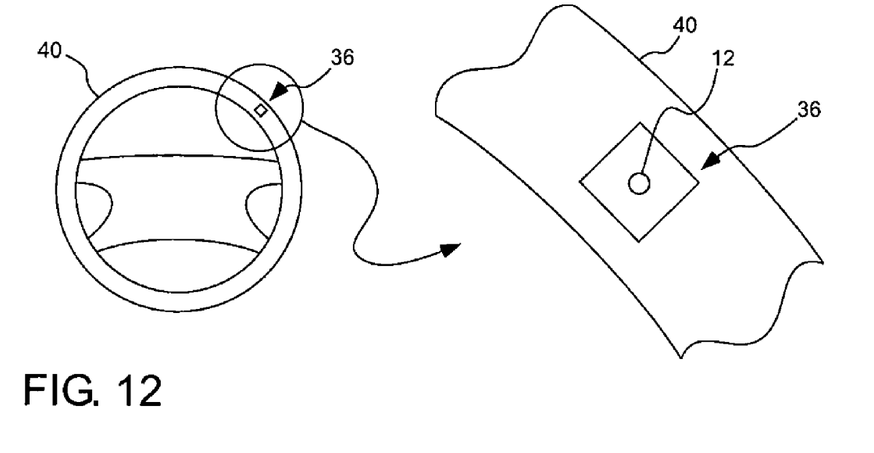
FIG. 12 illustrates an application of the present invention as incorporated into a vehicle steering wheel application.

In those embodiments where the location of the well coincides with the location of the contact pad, the well can also serve to isolate the portion of skin that serves as the target area to aid a user in more clearly discerning movement of the contact pad across the target area. The general structure into which, or with which, the well can be associated can vary widely. In the embodiment shown in FIG. 11, two wells 36 are incorporated into a stylus 29 to enable contact pads 12 to provide directional instruction or information to a wielder of the stylus. FIG. 12 illustrates an exemplary application of the present invention in use with a vehicle. In this embodiment, the well 36 can be installed on (or in) a steering wheel 40 to enable contact pad 12 to provide directional commands to a driver through a tactile interface. Note that, in FIG. 12, the shear display is indicated as installed in a location on the steering wheel facing the driver. In other applications, the shear display will be installed on (or in) the steering wheel so as to face the dashboard and be accessible by fingertips of the user that are wrapped about the rear of the steering wheel. In this application, the shear display can be utilized to provide tactile information to the user relating to a variety of differing aspects of operating the vehicle, including information relating to a direction of travel of the vehicle (including a direction of travel different than a present direction of travel), a speed of the vehicle, the presence of an incoming call on a vehicle communications device, etc. Generally speaking, any type of information typically provided by way of auditory or visual stimulus can be presented to the vehicle's operator via the present tactile display.

Figure 13:
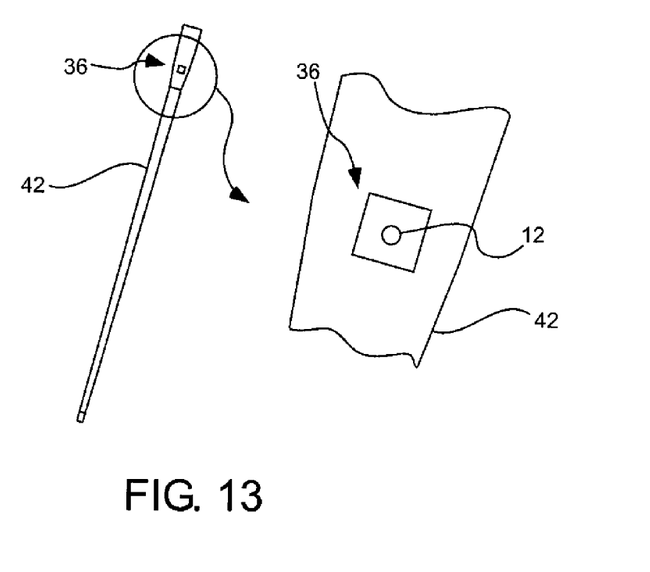
FIG. 13 illustrates an application of the present invention as incorporated into an ambulatory assist (e.g., walking cane) application.

In a similar application illustrated in FIG. 13, the well 36 can be incorporated into a walking cane 42 utilized by the visually impaired to enable contact pad 12 to provide directional commands through a tactile interface, possibly alerting the visually-impaired user of the presence of an upcoming obstacle (and/or directing the user around the obstacle).

The system can readily be adapted for a variety of applications, including many virtual reality applications. Also, the system can be readily adapted for use with many Global Positioning Systems ("GPS") to enable provision of information relating to position to users of vehicles, computing devices, ambulatory assistance devices, etc.

Generally speaking, the invention is a compact device that can provide 2-dimensional or 3-dimensional tactile feedback to the skin (e.g., a fingerpad or palm) of a human. This device could employ a small tactile element or block placed against the user's fingerpad to convey shifting contact location or skin shear along the surface of the user's fingerpad. This motion can be imparted in the directions both along the length of the finger and laterally (and can be selectively removed from the finger by movement normal to the skin surface away from the skin surface). The device's package design is meant to be compact and modular such that it could be placed on the fingerpad of a thimble interface or embedded as part of other apparatuses such as a computer mouse, steering wheel, telesurgical robot control interface, walking aids used by sight impaired individuals, wheelchairs, etc.

Methods of actuation will generally be compatible with a compact design and are also generally power efficient. Piezoelectric actuators or electromagnetic motors can be utilized in the actuation system; the use of Shape Memory Alloy (SMA) actuators is also particularly attractive from a packaging standpoint. The design of the shear displays can be miniaturized and optimized for two or three axes of motion. The minimum motion capability for the device can be in the range of ±0.050 mm of motion on 2 axes. In one aspect of the invention, the range of motion of can be on the order of 0.05 mm to about 2 mm. In another aspect, the range can vary from a minimum of about 0.05 mm to about 1 mm. In one aspect of the invention, the motion of the contact pad and the target area of skin is limited, restrained or restricted to less than 2 mm of total relative travel. In one aspect, the total relative travel is limited to 1 mm or less. In another embodiment, the total relative travel is limited to 4 mm or less.

Contact pads utilized in the present invention can be relatively small relative to an orifice formed in finger well or other structure, as in the embodiment illustrated in FIG. 9. In other aspects, however, the contact pad can be much larger than the opening or orifice through which a user senses motion of the contact pad. The contact pad can also be carried by much larger underlying structure, and multiple contact pads can be utilized where appropriate. Also, multiple openings or finger wells can be utilized, with one or more contact pads being associated therewith.

The device allows a person to receive touch (shear) feedback in a wide variety of applications where touch feedback is not currently possible. Current tactile (touch) feedback interfaces tend to have large package size making them inappropriate to be placed in a thimble or portable device.

Furthermore, this device can be used to provide information about a computer interface or suggested direction cues to the operator of a computer, car, or various portable devices. The device has the potential to provide touch feedback in applications where audible or voice cues are solely given currently; this device hence provides the opportunity to reduce cognitive load by providing a more intuitive conduit for communicating spatial and/or directional information (e.g., directions by computer cursor location).

The compact shear display can be used in a variety of manners. In one aspect, the device can be used to provide tactile feedback and to be used in combination with a commercial 3-D force feedback device, such as one sold under the trade name PHANToM, made by SensAble Technologies, or other similar commercial force feedback devices. For example, the present device could be used to replace PHANToM's current thimble interface.

In other embodiments of the invention, the shear display can be added to enhance (or replace) the data input device used as the common computer "mouse." The display can be used in combination with a finger-based touchpad. The tactile feedback device could be used in at least two ways. The shear display could be used to represent the current location of the computer cursor. Alternatively, the device could be used to transmit shearing motions to the skin of the fingerpad to suggest which direction the user should move their finger to attend to a particular task or application, thus providing attention cueing capability to the user.

Because of its compact design, the inventor's shear feedback device can be added to many current devices, and is suitable for applications in wearable or mobile computing. For example, it can be used as part of a gaming controller interface. The device is also well suited for applications which require communication of directional information. An example of this includes embedding several of the shear display devices into the steering wheel of an automobile (or other similar vehicle), to communicate information from a GPS navigation system. The shearing motion provided to the user's skin in each of these applications can provide suggested direction cues to greatly enhance the ability of the user to operate the vehicle.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by any claims associated with this or related applications.

I claim:

1. A tactile display, comprising:
a restraining system including: i) a base component having a recession formed therein, the recession being operable to receive a portion of a user's skin therein; ii) an orifice formed through the recession and through which a target area of the user's skin can be positioned, the recession being thereby operable to restrain a portion of the user's skin that is immediately adjacent the target area of the skin while leaving exposed through the orifice the target area of the user's skin such that a contact pad can make contact with the target area of the user's skin;
a contact pad, positioned adjacent the orifice and being operable to engage the target area of the user's skin as the target area of the user's skin protrudes through the orifice; and
an actuation system, operably coupled to one of: i) the contact pad and the ii) restraining system; the actuation system being capable of moving the contact pad and the restraining system relative to one another within a two-dimensional plane tangential to the target area of the user's skin to apply a shear force across the target area of the user's skin to thereby provide tactile information to the user.

2. The display claim 1, wherein the restraining system includes a strap coupleable to a portion of the user's hand.

3. The display claim 1, wherein the restraining system includes a finger thimble, the finger thimble including the base component.

4. The display of claim 1, wherein one or both of the restraining system and the contact pad are moveable relative to the other in at least three degrees of freedom.

5. The display of claim 4, wherein the contact pad and the restraining system are moveable relative to one another in a direction normal to, and away from, the target area of the user's skin.

6. The display of claim 5, wherein the contact pad and the restraining system are moveable relative to one another in the normal direction at an ultrasonic rate to enable creation of a varying coefficient of friction between the contact pad and the target area of the user's skin.

7. The display of claim 1, wherein the display is coupled to an external, operable apparatus, the external, operable apparatus being selected from the group consisting of: a vehicle, an ambulatory assistance device; a personal computing device or personal computing device accessory.

8. The display of claim 1, wherein the two-dimensional plane has a width of 10 millimeters and a length of 10 millimeters.

9. The display of claim 1, wherein the two-dimensional plane has a width of 4 millimeters and a length of 4 millimeters.

10. The display of claim 1, wherein a width of the contact pad is at least about 3 millimeters.

11. The display of claim 1, wherein the target area of the user's skin is a portion of the user's skin contacted by the contact pad.

12. A method of providing directional cues to a user, comprising:
   restraining a portion of at least one of the user's fingers by:
      positioning within a recession formed in a restraining system a portion of the user's finger, the recession having an orifice formed therein;
      positioning through the orifice a target area of skin of the user, wherein the restrained portion of at least one of the user's fingers substantially surrounds the target area;
   engaging with a contact pad the target area of skin of the user as the target area of skin extends at least partially through the orifice; and
   moving the target area of skin and the contact pad relative to one another to provide a shear force across the target area of skin of the user to provide a directional cue to the user.

13. The method of claim 12, wherein the directional cue relates to a subset of information available to the user.

14. The method of claim 13, wherein the subset of information is selected from the group consisting of: a subportion of a computer monitor; a subportion of an information display panel; a subset of a data set; and a subset of navigation options.

15. The method of claim 12, wherein moving the target area of skin and the contact pad relative one another comprises moving one of the target area of skin and the contact pad in at least three degrees of freedom.

16. The method of claim 12, wherein the target area of skin of the user is located on a ventral portion of the user's finger.

17. A method of providing an operator of a vehicle with directional cues while the operator is operating a vehicle, comprising:
   restraining a finger of the user with a restraining structure coupled to or formed in the vehicle, to thereby at least partially restrain some skin of the finger, the restraining structure including at least a recession having an orifice formed therein such that a target area of skin of the finger protrudes through the orifice while the finger is restrained by the restraining structure, wherein the restrained portion of at least one of the user's fingers substantially surrounds the target area; and
   engaging the target area of skin of the finger with a contact pad; and moving the contact pad and the target area of skin relative to the finger within a two-dimensional plane tangential to the target area of the user's skin to thereby provide directional cues to the user, the directional cues being related to a directional aspect of the vehicle.

18. The method of claim 17, wherein the restraining structure is coupled to or formed within a steering component of the vehicle.

19. The method of claim 18, wherein the steering component of the vehicle comprises a steering wheel.

20. The method of claim 17, wherein moving the contact pad and the target area of skin relative to the finger comprises moving one of the contact pad and the target area of skin in at least three degrees of freedom.

\* \* \* \* \*